(12) United States Patent
Cohen-Duwek et al.

(10) Patent No.: US 12,177,572 B2
(45) Date of Patent: Dec. 24, 2024

(54) OBJECT TRACKING BY EVENT CAMERA

(71) Applicant: The Open University, Raanana (IL)

(72) Inventors: Hadar Cohen-Duwek, Tel-Aviv (IL); Elishai Ezra Tsur, Jerusalem (IL)

(73) Assignee: The Open University, Raanana (IL)

( * ) Notice: Subject to any disclaimer, the term of this patent is extended or adjusted under 35 U.S.C. 154(b) by 202 days.

(21) Appl. No.: 17/814,036

(22) Filed: Jul. 21, 2022

(65) Prior Publication Data
US 2023/0021408 A1    Jan. 26, 2023

Related U.S. Application Data

(60) Provisional application No. 63/224,107, filed on Jul. 21, 2021.

(51) Int. Cl.
| | |
|---|---|
| *H04N 23/695* | (2023.01) |
| *B25J 9/16* | (2006.01) |
| *G06T 1/00* | (2006.01) |
| *G06T 7/20* | (2017.01) |
| *G06T 7/50* | (2017.01) |
| *H04N 23/54* | (2023.01) |
| *H04N 23/80* | (2023.01) |

(52) U.S. Cl.
CPC .......... *H04N 23/695* (2023.01); *B25J 9/1664* (2013.01); *G06T 1/0014* (2013.01); *G06T 7/20* (2013.01); *G06T 7/50* (2017.01); *H04N 23/54* (2023.01); *H04N 23/80* (2023.01); *G06T 2207/20084* (2013.01)

(58) Field of Classification Search
CPC ...... H04N 23/695; H04N 23/54; H04N 23/80; B25J 9/1664; B25J 9/1697; G06T 1/0014; G06T 7/20; G06T 7/50; G06T 2207/20084
See application file for complete search history.

(56) References Cited

U.S. PATENT DOCUMENTS

| | | | |
|---|---|---|---|
| 11,041,927 B1* | 6/2021 | Wheaton | G06V 10/764 |
| 2008/0170749 A1* | 7/2008 | Albertson | G06V 10/95 |
| | | | 382/103 |
| 2020/0348755 A1 | 11/2020 | Gebauer et al. | |

(Continued)

OTHER PUBLICATIONS

G. Gallego, et al "Event-based Vision: A Survey," IEEE transactions on pattern analysis and machine intelligence, 2020.

(Continued)

*Primary Examiner* — Nasim N Nirjhar
(74) *Attorney, Agent, or Firm* — FISHERBROYLES, LLP; Roger L. Browdy; Ronni S. Jillions

(57) ABSTRACT

A tracking system is disclosed utilizing one or more dynamic vision sensors (e.g., an event camera) configured to generate luminance-transition events associated with a target object, a depth estimation unit configured to generate based on the luminance-transition events depth data/signals indicative of a distance of the target object from the event camera, a spatial tracking unit configured to generate based on the luminance-transition events spatial tracking signals/data indicative of transitions of the target object in a scene of the target object, and an error correction unit configured to process the depth and spatial tracking data/signals and generate error correcting data/signals for the tracking of the target object by the one or more dynamic vision sensors.

22 Claims, 7 Drawing Sheets

(56) References Cited

U.S. PATENT DOCUMENTS

| | | | |
|---|---|---|---|
| 2022/0009439 A1 | 1/2022 | Campos Macias et al. | |
| 2022/0197312 A1 | 6/2022 | Vemprala et al. | |
| 2022/0301304 A1* | 9/2022 | Hampali | G06V 20/20 |

OTHER PUBLICATIONS

A. Lukezic, et al, "Discriminative correlation filter with channel and spatial reliability," in Proceedings of the IEEE conference on computer vision and pattern recognition, 2017.

M. Song, et al "Monocular Depth Estimation Using Laplacian Pyramid-Based Depth Residuals," IEEE Transactions on Circuits and Systems for Video Technology, 2021.

C. Scheerlinck, et al "Fast image reconstruction with an event camera," in Proceedings of the IEEE/CVF Winter Conference on Applications of Computer Vision, 2020.

C. Eliasmith and C. H. Anderson, Neural engineering: Computation, representation, and dynamics in neurobiological systems, MIT press, 2003.

A. Hazan and E. Ezra Tsur, "Neuromorphic Analog Implementation of Neural Engineering Framework-Inspired Spiking Neuron for High-Dimensional Representation," Frontiers in Neuroscience, vol. 15, p. 109, 2021.

T. DeWolf et al, "Nengo and low-power AI hardware for robust, embedded neurorobotics," Frontiers in Neurorobotics, vol. 14, 2020.

Hu, et al, "v2e: From Video Frames to Realistic DVS Events," in IEEE/CVF Conference on Computer Vision and Pattern Recognition Workshops (CVPRW), 2021.

F. Barranco, et al, "Real-time clustering and multi-target tracking using event-based sensors," in IEEE/RSJ International Conference on Intelligent Robots and Systems (IROS), 2018.

R. Jiang, et al"Object tracking on event cameras with offline-online learning," CAAI Transactions on Intelligence Technology, vol. 5, No. 3, pp. 165-171, 2020.

B. Ramesh, et al "e-TLD: Event-based Framework for Dynamic Object Tracking," IEEE Transactions on Circuits and Systems for Video Technology, 2020.

A.. Ussa, et al "A Hybrid Neuromorphic Object Tracking and Classification Framework for Real-time Systems," arXiv preprint, p. 2007.11404, 2020.

Y. Zaidel, et al "Neuromorphic NEF-based inverse kinematics and PID control," Frontiers in Neurorobotics, vol. 15, 2021.

C. Godard, et al "Digging Into Self-Supervised Monocular Depth Estimation", Proc. IEEE Int. Conf. Comput. Vis. 2019.

X. Luo, et al, "Consistent Video Depth Estimation", ACM Transactions on GraphicsVolume 39, Issue 4, Jul. 2020.

L. Wang, et al "EventSR: From Asynchronous Events to Image Reconstruction, Restoration, and Super-Resolution via End-to-End Adversarial Learning", Proceedings of the IEEE/CVF Conference on Computer Vision and Pattern Recognition, Seattle, WA, USA, Jun. 14-19, 2020; pp. 8315-8325.

B. Su, et al "Event-Based High Frame-Rate Video Reconstruction With a Novel Cycle-Event Network", IEEE Int. Conf. Image Processing (ICIP), 2020.

M. Mostafavi, et al "Learning to Reconstruct HDR Images from Events, with Applications to Depth and Flow Prediction", International Journal of Computer Vision (2021) 129:900-920.

H. Rebecq, et al "Events-to-Video: Bringing Modern Computer Vision to Event Cameras", Proceedings of the IEEE Conference on Computer Vision and Pattern Recognition, CVPR 2019, pp. 3857-3866, Computer Vision Foundation/IEEE, Long Beach, CA, USA, Jun. 2019.

H. Cohen Duwek, et al "Image Reconstruction from Neuromorphic Event Cameras using Laplacian-Prediction and Poisson Integration with Spiking and Artificial Neural Networks", IEEE Conf. Computer Vision and Pattern Recognition Workshops (CVPRW), 2021.

S. Xie, et al "Aggregated residual transformations for deep neural networks," in Proc. IEEE Int. Conf. Comput. Vis. Pattern Recognit., Jul. 2017, pp. 5987-5995.

Tsur, Elishai Ezra. Neuromorphic Engineering: The Scientist's, Algorithm Designer's, and Computer Architect's Perspectives on Brain-Inspired Computing. CRC Press, 2021.

* cited by examiner

OBJECT TRACKING BY EVENT CAMERA

TECHNOLOGICAL FIELD

The present invention is generally in the field of object tracking.

BACKGROUND

This section intends to provide background information concerning the present application, which is not necessarily prior art.

Neuromorphic (brain-inspired) vision and sound processing are considered to be the most consequential technologies of neuromorphic engineering. Neuromorphic vision sensors, inspired by the biological retina, are camera-like devices that communicate transients in luminance as events. These events-cameras, also known as dynamic vision sensors (DVS), comprise an array of silicon neurons, tuned to generate address-encoding spikes in response to changes in luminance at individual pixels (referred to herein as pixel-level luminance-transient events). The pixel-level luminance-transient events generated by such event cameras are typically time-multiplexed on a shared bus using the address event representation (AER) protocol.

Event cameras are recently attracting increased attention due to their high frame rate, temporal resolution, dynamic range, and signal-to-noise ratio. These event cameras are, therefore, utilized in diverse applications ranging from star tracking in space to simultaneous localization and mapping (SLAM) in autonomous vehicle driving applications (see e.g., [1]).

Adaptive robotic stands at the frontier of neurorobotics. Adaptive robotic systems developed nowadays are configured to adapt to changing environmental conditions utilizing artificial intelligence to provide tolerance for position variance, disturbance rejection and transferable intelligence. Recently, adaptive neuro-controllers were shown to dramatically outperform conventional controllers in terms of performance and energy efficiency (see e.g., [7]). Adaptive robotics requires error-correcting signals to modulate its controller following changes in the environment.

Visual tracking with event cameras has been extensively explored in the past decay. In recent work, Francisco and colleagues proposed a method for multi-target tracking and clustering using mean-shift clustering for labeling individual events and Kalman filters for smoothing trajectory (see [9]). In contrast to previous works, this method does not reconstruct intensity or accumulate events to create event tensors. However, objects were recognized in this work on a non-textured background, allowing tracking with a relatively small number of visual features.

More recently, Rui and colleagues used offline you only look once (YOLO)-based preprocessing and online learning with correlation and Kalman filters (see [10]). This method, however, is limited to objects of predefined categories. Moreover, having autonomous driving in mind, this method was only evaluated on cars in urban scenarios and not on in-door cases.

Another recent work by Ramesh and colleagues proposed the use of a tracker-detector scheme (see [11]). Using the high temporal resolution of the event camera, the tracker enables fast searches in a localized area. Meanwhile, the detector performs slow global searches and can recover from failures and occlusions. This approach departs from the neural network data-driven approach, mainly relying on support vector machines (SVM). It is, therefore, hard to realize on neuromorphic hardware.

Interestingly, Andres and colleagues recently demonstrated tracking feasibility with a hybrid neuromorphic chip (see [12]). For tracking an object, event-based binary images were accumulated and tracked using an overlap-based algorithm implemented on non-neuromorphic hardware. To classify an object, the binary image was converted back to spikes and processed in IBM's neuromorphic chip. This approach, however, does not consider the richness in features space created by image reconstruction. Importantly, while these works dramatically advanced the field of event-based computer vision, they were not concentrated on deriving exact position in three-dimensional space but rather on tracking an object, preferably for further classification.

Some control and/or visualization techniques employing event cameras known from the patent literature are briefly described hereinbelow.

US patent publication No. 2022/009439 discloses enhanced occupant collision safety system and method in a vehicle. A system for controlling deployment of vehicle safety mechanisms of a host vehicle, includes a sensor array interface to receive acceleration data from an impact sensor, an image processor to receive events from an event camera, the event camera configured to monitor a scene of an interior of the host vehicle that includes an occupant, and an occupant safety system controller to: cluster the events to discriminate between events associated with a background of the scene and events associated with a body part of the occupant; detect a collision based on the acceleration data; verify the collision based on the events associated with the background of the scene; and in response to verifying the collision, cause a collision safety mechanism of the host vehicle to deploy.

US patent publication No. US 2020/348755 discloses a device receiving a stream of pixel events output by an event camera to derive an input image by accumulating pixel events for multiple event camera pixels. The device generates a gaze characteristic using the derived input image as input to a neural network trained to determine the gaze characteristic. The neural network is configured in multiple stages. The first stage of the neural network is configured to determine an initial gaze characteristic, e.g., an initial pupil center, using reduced resolution input(s). The second stage of the neural network is configured to determine adjustments to the initial gaze characteristic using location-focused input(s), e.g., using only a small input image centered around the initial pupil center. The determinations at each stage are thus efficiently made using relatively compact neural network configurations. The device tracks a gaze of the eye based on the gaze characteristic.

US patent publication No. US 2022/197312 discloses a computer implemented method for controlling a system moving through an environment that includes receiving a stream of event data from an event camera, the stream of event data representing a pixel location, a time stamp, and a polarity for each event detected by the event camera. A compressed representation of the stream of data is generated. The compressed representation is provided to a neural network model trained on prior compressed representations using reinforcement learning to learn actions for controlling the system. A control action is generated via the neural network model to control the movement of the system.

GENERAL DESCRIPTION

One of the first and most remarkable successes in neuromorphic (brain-inspired) engineering was the development of bio-inspired event cameras that generates pixel-level luminance transient events. The present disclosure provides three-dimensional tracking techniques that combines spatial tracking with depth estimation techniques to generate tracking data from pixel-level luminance-transients events generated by event camera(s). The present disclosure demonstrates that using image reconstruction techniques (e.g., implemented by FireNet convolution neural network as described in [4]) employing pixel-level luminance-transients events generated by an event camera, augments visual features and dramatically increases tracking performance.

The three-dimensional object tracking techniques disclosed herein are used in some embodiments to neuromorphically represent error-correcting signals, that can further be used for motion correction in adaptive neurorobotics and other possible applications.

In some embodiments a tracking system is provided comprising an event camera configured to generate luminance-transitions events associated with a target object, a depth estimation unit configured to generate depth data/signals associated with the target object based on the luminance-transitions events generated by the event camera, a spatial tracking unit configured to generate spatial tracking signals/data associated with the target object based on the luminance-transitions events generated by the event camera, and an error correction unit configured to process the depth and spatial tracking data/signals and generate error correcting data/signals for the tracking of the target object.

The system can comprise a summation unit configured to summate data blocks frames comprising the luminance-transitions events generated by the event camera and input the same to the depth estimation and spatial tracking units. Alternatively, or additionally, the system can comprise a two-dimensional image reconstruction unit configured to generate image reconstruction data based on the luminance-transitions events generated by the event camera, and input the same to the depth estimation and spatial tracking units.

A data processing unit can be used to process the error correcting data/signals from the error correction unit and generate a neuromorphical data/signal for the error correcting data/signals for the tracking. The system utilizes in some embodiments a spiking neural network configured to receive the neuromorphical data/signal from the data processing unit and generate therefrom neuromorphic control signals/data for the tracking.

Optionally, the event camera is mounted on a robotic arm system configured to move towards the target object, or move away from the target object.

In other possible embodiments a method is provided for tracking a target object by luminance-transitions events. The method can comprise estimating depth data/signals associated with the target object based on the luminance-transitions events, generating spatial tracking signals/data of the motion with respect to the target object based on the luminance-transitions events, and processing the depth and spatial tracking data/signals and generating error correcting data/signals for the tracking of the motion with respect to the target object.

The method comprises in some embodiments summating data frames comprising the luminance-transitions events and using the same for the estimation of the depth data/signals and the generation of the spatial tracking data/signals. Alternatively, or additionally, the method comprises reconstructing a two-dimensional image based on the luminance-transitions events, and using the same for the estimation of the depth data/signals and the generation of the spatial tracking data/signals.

In some embodiments the method comprises processing the error correcting data/signals and generating a neuromorphical data/signal for the error correcting data/signals for the tracking. The method may further comprise generating from the neuromorphical data/signal neuromorphic control signals/data for the tracking.

In one aspect the present application is directed to a tracking system comprising one or more dynamic vision sensors (e.g., an event camera) configured to generate luminance-transition events associated with a target object, a depth estimation unit configured to generate based on the luminance-transition events generated by the event one or more dynamic vision sensors depth data/signals indicative of a distance of the target object from the one or more dynamic vision sensors, a spatial tracking unit configured to generate based on the luminance-transition events generated by the event one or more dynamic vision sensors spatial tracking signals/data indicative of transitions of the target object in a scene of the target object, and an error correction unit configured to process the depth and spatial tracking data/signals and generate based thereon error correcting data/signals for the tracking of the target object by the one or more dynamic vision sensors.

The system comprises in some embodiments an image reconstruction unit configured to generate image reconstruction data based on the luminance-transitions events generated by said one or more dynamic vision sensors, and input the same to the depth estimation and spatial tracking units. An events processing unit can be used to arrange the luminance-transition events generated by the one or more dynamic vision sensors in one or more luminance-transient event frames for the generation of the depth data/signals by the depth estimation unit, and for the generation of the spatial tracking signals/data by the spatial tracking unit, therefrom. Optionally, but in some embodiments preferably, a summation unit is used to summate the one or more luminance-transition events frames generated by the events processing unit for the generation of the depth data/signals by the depth estimation unit, and for the generation of the spatial tracking signals/data by the spatial tracking unit, therefrom.

In some embodiments one or more neural networks are used to generate based on the error correcting data/signals, control data/signals for adjusting the location of the one or more dynamic vision sensors with respect to the target object. The system comprises in some embodiments an encoding unit configured to encode the error correction-data/signals generated by the error correction unit for generation of the control data/signals by the one or more neural networks. Optionally, but in some embodiments preferably, the one or more neural networks comprises a spiking neural network.

The system comprises in some embodiments one or more actuators configured to move the one or more dynamic vision sensors with respect to the target object in accordance with the control data/signals. For example, the one or more dynamic vision sensors can be mounted on a robotic arm system configured to move the one or more dynamic vision sensors with respect to the target object in correspondence with the error correcting data/signals. Optionally, but in some embodiments preferably, the spatial tracking unit employs channel and spatial reliability tracking techniques and the depth estimation unit employs a Laplacian pyramid-based monocular depth estimation neural network.

In another aspect the present application is directed to a method of tracking a target object based on luminance-transitions events e.g., acquired by one or more dynamic vision sensors (e.g., of an event camera) from a scene comprising said target object. The method comprising estimating depth data/signals associated with the target object based on the luminance-transitions events, generating spatial tracking signals/data indicative of transitions of the target object in the scene based on the luminance-transitions events, and processing the depth and spatial tracking data/signals and generating error correcting data/signals for the tracking of the target object e.g., by the one or more dynamic vision sensors. The method can comprise arranging the luminance-transitions events in one or more luminance-transients event frames and summating the one or more luminance-transients event frames for the estimation of the depth data/signals and for the generation of the spatial tracking data/signals.

Optionally, but in some embodiments preferably, the method comprising reconstructing a two-dimensional image based on the luminance-transitions events for the estimation of the depth data/signals and for the generation of the spatial tracking data/signals. The error correcting data/signals can be processed by one or more neural networks for generating control data/signal for the tracking of the target object. In possible embodiments the error correcting data/signals are processed for generating therefrom corresponding spike data/signal for generation of the control data/signal by the one or more neural networks.

The method comprises in some embodiments processing the error correcting data/signals by one or more neural networks and generating control data/signal for the tracking of the target object. For example, the error correcting data/signals can be processed for generating therefrom corresponding spike data/signal for generation of the control data/signal by the one or more neural networks.

BRIEF DESCRIPTION OF THE DRAWINGS

In order to understand the invention and to see how it may be carried out in practice, embodiments will now be described, by way of non-limiting example only, with reference to the accompanying drawings. Features shown in the drawings are meant to be illustrative of only some embodiments of the invention, unless otherwise implicitly indicated. In the drawings like reference numerals are used to indicate corresponding parts, and in which:

FIGS. 3A and 3B shows tests results obtained using the three-dimensional tracking according to possible embodiments, wherein FIG. 3A shows tracking and depth map results and FIG. 3B shows HoG (histogram of oriented gradients) features magnitude from reconstructed and accumulated frames, as calculated from event tensors.

DETAILED DESCRIPTION OF EMBODIMENTS

Figure 1A:
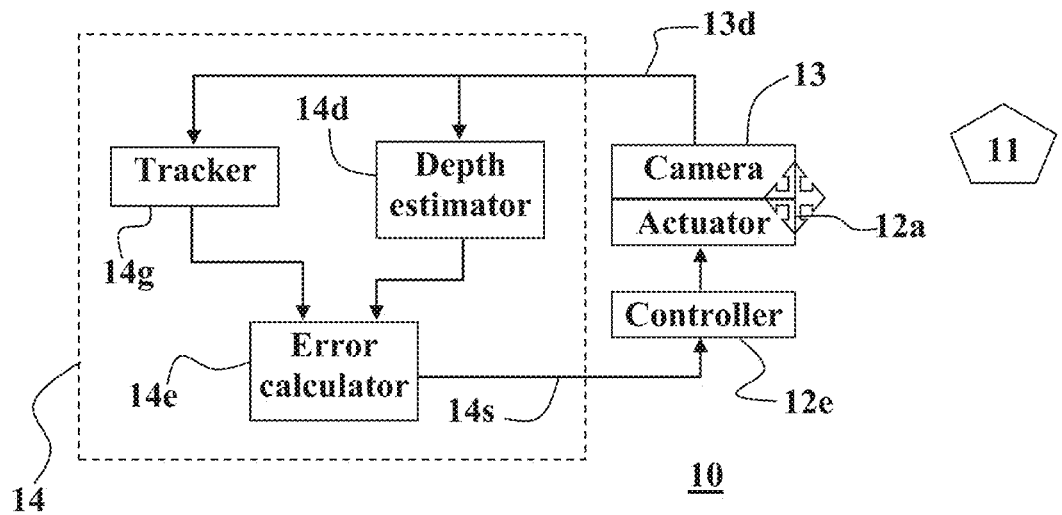
FIGS. 1A to 1D schematically illustrate three-dimensional tracking architectures according to some possible embodiments.

One or more specific and/or alternative embodiments of the present disclosure will be described below with reference to the drawings, which are to be considered in all aspects as illustrative only and not restrictive in any manner. It shall be apparent to one skilled in the art that these embodiments may be practiced without such specific details. In an effort to provide a concise description of these embodiments, not all features or details of an actual implementation are described at length in the specification. Elements illustrated in the drawings are not necessarily to scale, or in correct proportional relationships, which are not critical. Emphasis instead being placed upon clearly illustrating the principles of the invention such that persons skilled in the art will be able to make and use the object tracking techniques, once they understand the principles of the subject matter disclosed herein. This invention may be provided in other specific forms and embodiments without departing from the essential characteristics described herein.

The present application discloses three-dimensional object tracking techniques utilizing an event camera e.g., configured to generate neuromorphic event-driven data, with and without prior image reconstruction. The three-dimensional tracking is based in some embodiments on combinations of spatial object tracking (e.g., channel and spatial reliability tracking—CSRT such as disclosed in [2]) techniques with depth estimation techniques (e.g., Laplacian pyramid-based monocular depth estimation neural network—LapDepth such as disclosed in [3], self-supervised monocular depth estimation such as disclosed in [14], video depth estimation such as disclosed in [15]).

In possible embodiments, prior image reconstruction is used for the spatial object tracking and for the depth estimation. The image reconstruction can be implemented using any suitable pixel-level luminance-transients event based image reconstruction technique (e.g., fast image reconstruction from events neural network (FireNet) as disclosed in [4], end-to-end adversarial learning for image reconstruction, restoration, and super-resolution, from asynchronous events as disclosed in [16], event-based high frame-rate video reconstruction by cycle-event networks as disclosed in [17], HDR image reconstructions from Events such as disclosed in [18], computer vision by event cameras such as disclosed in [19], image reconstruction from neuromorphic event cameras using Laplacian-prediction and Poisson integration with spiking and artificial neural networks such as disclosed in [20]). Otherwise, a simple event accumulator can be used.

In some embodiments the three-dimensional tracker disclosed herein is configured to generate error-correcting data/signals by computing the deviation of the tracked object from the centerfield of view (FoV) of the of the event camera. The generated error-correcting signals can be neuromorphically represented using a neural engineering framework (NEF)-based spiking neural network (SNN), for further utilization in robotic adaptive control. The three-dimensional tracker embodiments disclosed herein were tested in a scenario wherein the event camera is mounted to a robotic arm and moved in three-dimensional space towards an object. The disclosed three-dimensional tracking techniques can thus provide three-dimensional motion-correcting error signals in real-time, which can be further utilized to neuromorphically optimize adaptive robotic systems.

For an overview of several example features, process stages, and principles of the invention, the examples of tracking an object by an event camera mounted on a robotic arm is illustrated schematically and diagrammatically in the figures are generally intended for three-dimensional tracking applications. These robotic arm tracking systems are shown as one example implementation that demonstrates a number of features, processes, and principles used for robotic applications, but they are also useful for other applications and can be made in different variations e.g., utilizing other types of DVS devices. Therefore, this description will proceed with reference to the shown examples, but with the understanding that the invention recited in the claims below can also be implemented in myriad other ways, once the principles are understood from the descriptions, explanations, and drawings herein. All such variations, as well as any other modifications apparent to one of ordinary skill in the art and useful in tracking applications may be suitably employed, and are intended to fall within the scope of this disclosure.

FIG. 1A is a block diagram of a tracking system 10 configured for tracking a target object 11 based on luminance-transients event data/signals 13d generated by a camera 13 mechanically coupled to one or more actuators 12a. The actuator(s) 12a is configured to move the camera 13 towards, or away from the, the target object 11 e.g., for monitoring the target object 11 or contacting/grabbing it, based on control data/signals 14s generated by the control system 14. The luminance-transients event data/signals 13d generated by the camera 13 are processed by a depth estimator 14d configured to determine depth of the (distance from) object 11, and generate depth data/signals indicative thereof. The luminance-transients event data/signals 13d are also processed by a tracker 14g configured to track the location of the object 11 within a 2D frame of field of view (the scene) of the camera 13, and generate tracking data/signals indicative thereof.

The depth data/signals from the depth estimator 14d, and the tracking data/signals form the tracker 14g are processed by an error calculator 14e configured to generate the error-correction data/signals 14s for a controller 12e of the actuator 12e, to accordingly adjust the movement of the camera 13 towards, or away from, the target object 11. This way a luminance-transients events based feedback loop for monitoring the object 11, and/or reaching, contacting or grabbing it, is obtained.

Figure 1B:
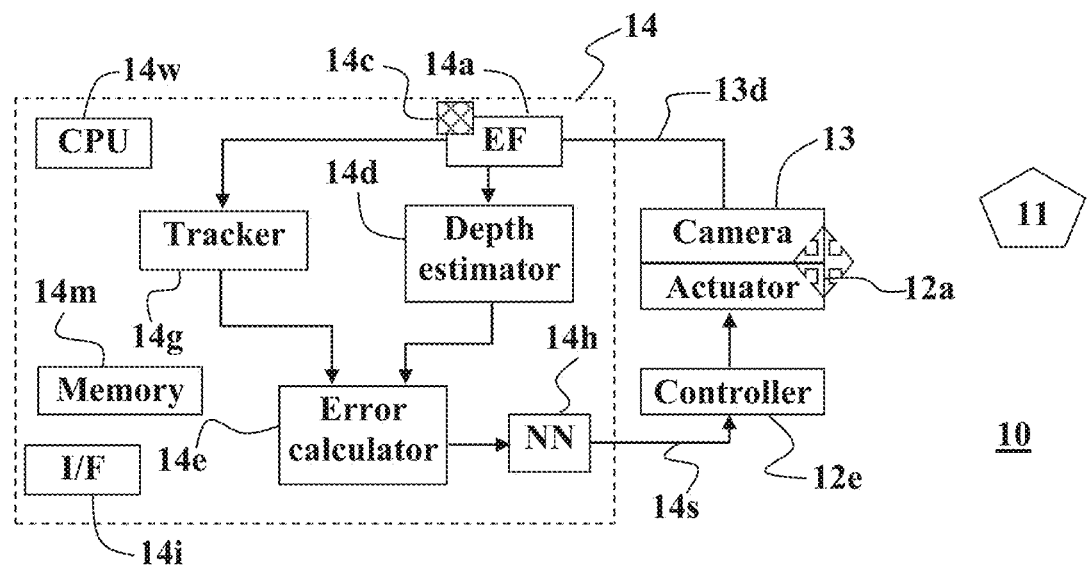
Figure 1C:
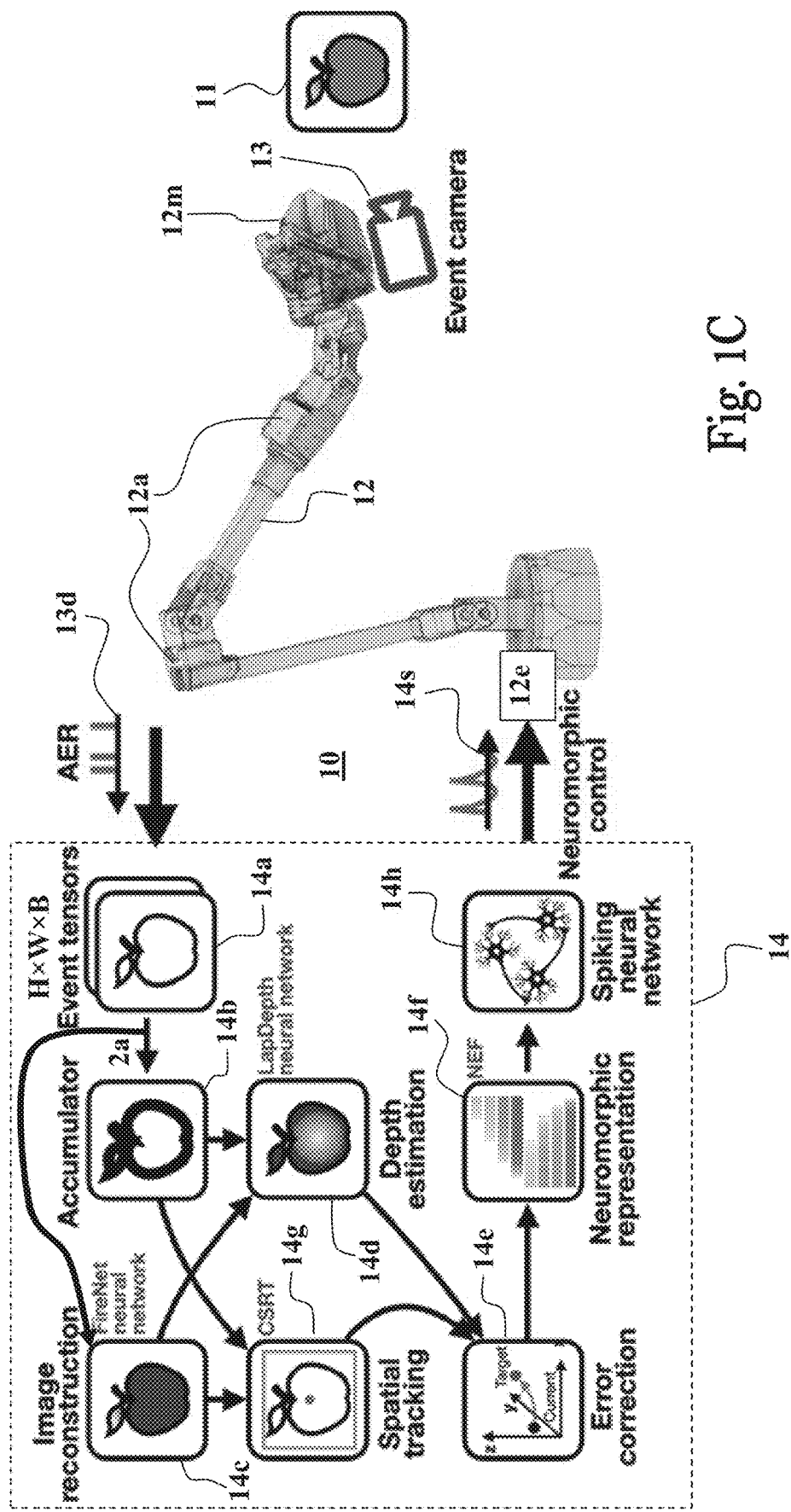
Figure 1D:
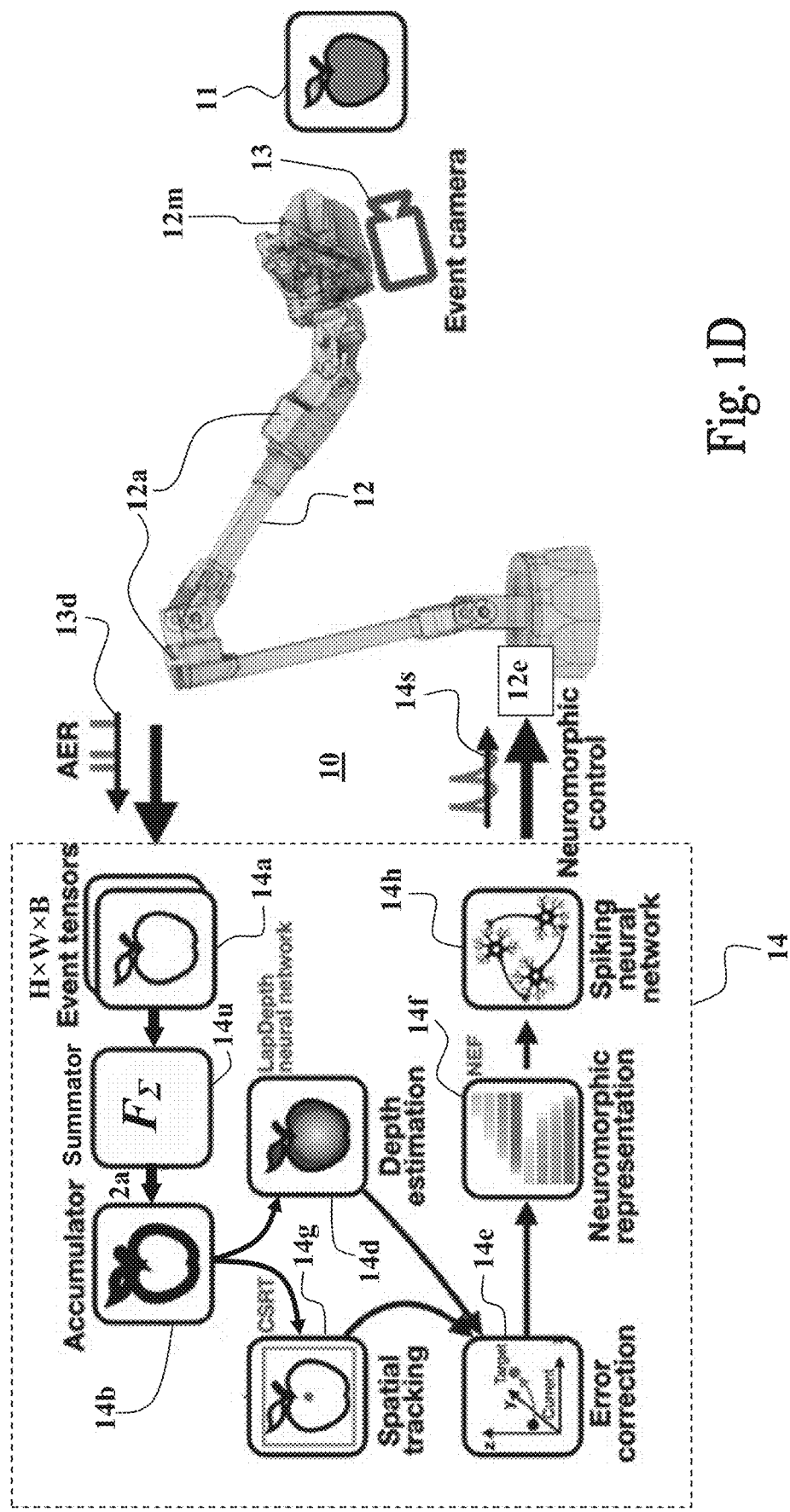

In some embodiments the luminance-transients event data/signals 13d processed by the tracker 14g and the depth estimator 14d, are arranged in luminance-transients event frames, or tensors of several luminance-transients event frames e.g., by the camera 13, by an intermediate event data/signals processing unit (14a in FIGS. 1C and 1D, or in the tracker 14g and the depth estimator 14d). Each luminance-transients event frame is associated with a scene comprising at least some portion of the target object, and one or more luminance-transients events data/signals associated therewith.

The tracker 14g can be implemented utilizing known spatial tracking techniques. Optionally, but in some embodiments preferably, the tracker is a channel and spatial reliability tracking (CSRT, see [2]) implementation. The depth estimator 14d can be implemented utilizing known depth estimation techniques, and in some embodiments the depth estimation task is accomplished utilizing one or more neural networks (NNs) trained to generate the depth data/signal based on the luminance-transients event data/signals 13d from the camera 13, and/or the luminance-transients event frames or tensors.

FIG. 1B is a block diagram of another embodiment of the tracking system 10 utilizing one or more NNs 14h in the control system 14, to process the error-correction data/signals generated by the error calculator 14e and generate the control data/signals 14s for operating the actuator(s) 12e accordingly. The NNs 14 can be trained for actuation of any suitable vehicle (e.g., robotic arm) capable of moving the camera 13 towards, or way from, the object 11, according to task(s) of the monitoring system 10.

As also seen in FIG. 1B, in some embodiments an events processing unit 14a is used to pre-process the luminance-transients event data/signals 13d, and arrange them in one or more luminance-transients event frames (EFs, tensor), for processing by the tracker 14g and the depth estimator 14d. Optionally, but in some embodiments preferably, the control system 14 further comprises an image reconstruction unit 14c in (or external to) the events processing unit 14a. The image reconstruction unit 14c can be configured to process the luminance-transient event frames/tensor generated by the processing unit 14a and reconstruct therefrom a two-dimensional (2D) image of the scene of the object 11.

In some embodiments the control system 14 is at least partially a hardware implementation of the different units, or a combination of software and hardware. The control system 14 can thus include one or more processors 14w and memories 14m configured and operable to store and execute computer programs/code and other data (e.g., logic, heuristics and/or meta, data) for carrying out at least some of its functionality. The control system 14 can further have a data communication interface (I/F) 14i configured to communicate data/signals with the camera 13 and/or the controller 12e. The I/F 14i can be configured for wireless data/signals communication (e.g., using WiFi, Bluetooth, Zigbee, NFS, or suchlike), and/or over data/signals communication wires (e.g., using a serial/parallel data communication bus, such as, USB, UART, SATA, SCSI, IDE, or suchlike).

FIG. 1C schematically illustrates a three-dimensional tracking system 10 according to some possible embodiments. In this specific and non-limiting example the three-dimensional tracking problem is manifested by a robotic arm system 12 equipped with an event camera (e.g., DAVIS 346 neuromorphic camera of iniVation, Zurich, Switzerland) 13 configured to communicate data/signals and/or control data/signals with a control system 14, for moving the manipulator(s)(e.g., gripper) 12m located at the free end of the robotic arm system 12 towards, or away, an object 11 (e.g., apple).

The control system 14 is configured and operable to receive and process luminance-transients event data/signals 13d generated by the event camera 13 as the robotic arm system 12 approaches (or moves-off) the object 11, and responsively generate control data/signals 14s for operating the actuator(s) 12a of the robotic arm system 12, for moving its manipulator 12m towards (or away) the object 11. Accordingly, the mounted event camera 13 is configured to provide visual guidance data/signals for controlling movements of the robotic arm system 12 in three-dimensional space, as it is manoeuvred with respect to the object 11.

The luminance-transients event data/signals 13d received by the control system 14 is processed by the events processing unit 14a to construct event tensors (e.g., three-dimensional matrices) of predefined dimensions. The event tensors generated by the processing unit 14a are also used by the image reconstruction unit 14c for generation of reconstructed two-dimensional images of the FOV of the event camera 13.

As exemplified in FIG. 1D, in possible embodiments the event tensors from the events processing unit 14a are accumulated by summation of their frames in the summation unit 14u, and the summated frames Fr are accumulated in the accumulator unit 14b for use by the spatial tracker unit 14g, and by the depth estimation unit 14d. In such possible embodiments the tracking system 10 is implemented without the image reconstruction unit (14c in FIG. 1C), and the H×W×B event tensors from the event processing unit 14a are summated across the temporal domain by the summation unit 14u, to periodically or intermittently obtain a single H×W summation frame $F_\Sigma$ i.e., $F_\Sigma = \Sigma_{i=1}^{B} F_{H \times W}^{(i)}$.

For the image reconstruction by unit 14c, the luminance-transients event data/signals 13d from the event camera 13 is preprocessed by the processing unit 14a to restructure the pixel-level luminance-transient events into H×W×B tensors (event tensors—$F_{H \times W}^{(1)}$, $F_{H \times W}^{(2)}$, ..., $F_{H \times W}^{(B)}$, wherein H and W are positive integers respectively of the number of pixels in the height and width of a frame $F_{H \times W}^{(i)}$ of the event camera 12 (where $1 \leq i \leq B$ is an integer number), and B is a positive integer number of the temporal bins of the tensor (in some embodiments B=5).

In some embodiments, the two-dimensional images reconstructed by the image reconstruction unit 14c are used for generation of spatial tracking data/signals by the spatial tracker unit (e.g., CSRT module) 14g. The two-dimensional images reconstructed by the image reconstruction unit 14c can be also used for generation of depth data/signals by the depth estimation unit 14d. The spatial tracking data/signals from the spatial tracker unit 14g together with the depth data/signals from the depth estimation unit 14d can be used by the error correction unit 14e to determine the three-dimensional position (e.g., x, y, z, coordinates) of the object 11 with respect to the event camera 13, which is then used for generation of error-correction data/signals with respect to the center of the two-dimensional reconstructed images generated by the image reconstruction unit 14c. Alternatively, or additionally, the accumulated event tensors from the accumulator 14b, and/or the summated frames Fr, are used for the generation of the spatial tracking data/signals by the spatial tracker unit 14g and/or for the generation of the depth data/signals by the depth estimation unit 14d.

In some embodiments the error-correction data/signals generated by the error correction unit 14e is processed by the encoding unit (e.g., neural engineering framework—NEF module) 14f to provide neuromorphically represented error correcting data/signals. For example, the encoding unit 14f can be configured to encode the error-correction data/signals (such as disclosed in [22]) generated by the error correction unit 14e into signals for positively encoded and/or negatively encoded neurons of the neural network 14h. However, the encoding unit 14f can be slightly differently configured for each encoding modality, and it was simplified in this non-limiting example for clarity (see e.g., [6]).

Figure 2A:
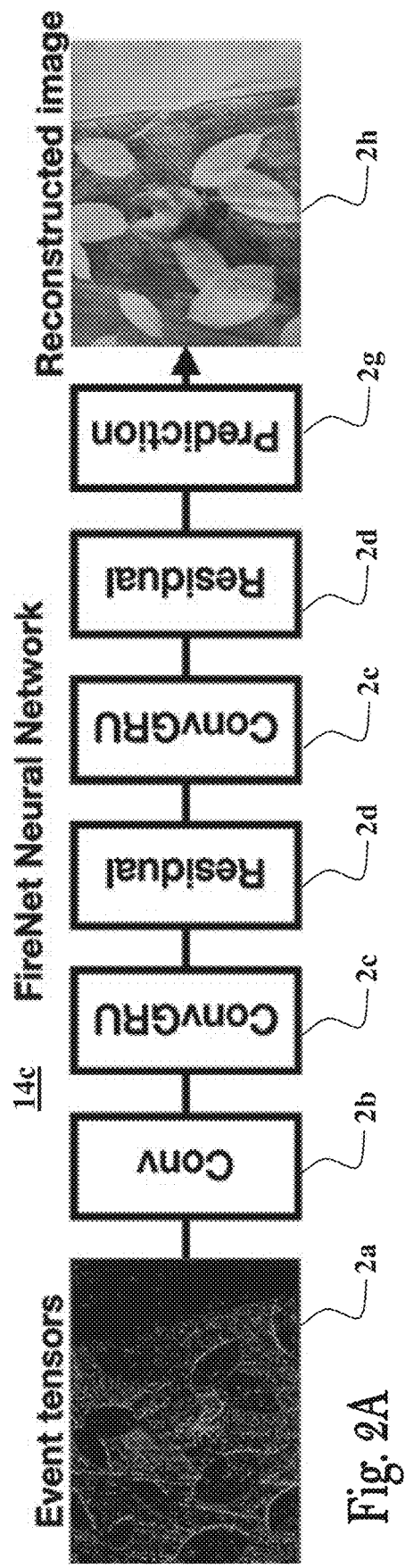
FIGS. 2A and 2B are block diagrams schematically illustrating possible embodiments of the image reconstruction and depth estimation units, respectively, according to some possible embodiments.

FIG. 2A is a block diagram schematically illustrating a possible embodiment of the image reconstruction unit 14c, used to reconstruct the two-dimensional images from event tensors generated by the event data/signal processing unit 14a, or from the summation frames $F_\Sigma$ generated by the summation unit 14u. In this specific and non-limiting example the image reconstruction unit 14c comprises a pre-trained deep FireNet neural network (see e.g., [4]). As shown in FIG. 2A, in possible embodiments the processing of the event tensors/summation frames (i.e., the event tensors or the summation frames $F_\Sigma$) 2a by the image reconstruction unit 14c starts in the processing of the event tensors/summation frames 2a by a convolutional (Conv) neural network 2b, followed thereafter by processing by a convolutional gate recurrent unit (ConvGRU) 2c, and thereafter by a residual (ResNet) neural network 2d. As seen, the signals/data obtained this way can be further processed by a further convolutional gate recurrent unit (ConvGRU) 2c and residual (ResNet) unit 2d.

The signals/data from the one or more layers of the convolutional gate recurrent unit (ConvGRU) 2c and the residual (ResNet) neural network 2d is then processed by the prediction unit 2g that generates the two-dimensional reconstructed image 2h. This implementation of the image reconstruction unit 14c provides an event-based image reconstruction with a relatively low number of trainable parameters (e.g., 37,000) and a fast operation (e.g., 10 mSec). In a possible embodiment the image reconstruction unit 14c is trained on the MS-COCO (https://cocodataset.org/#home) database with simulated camera motions.

Figure 2B:
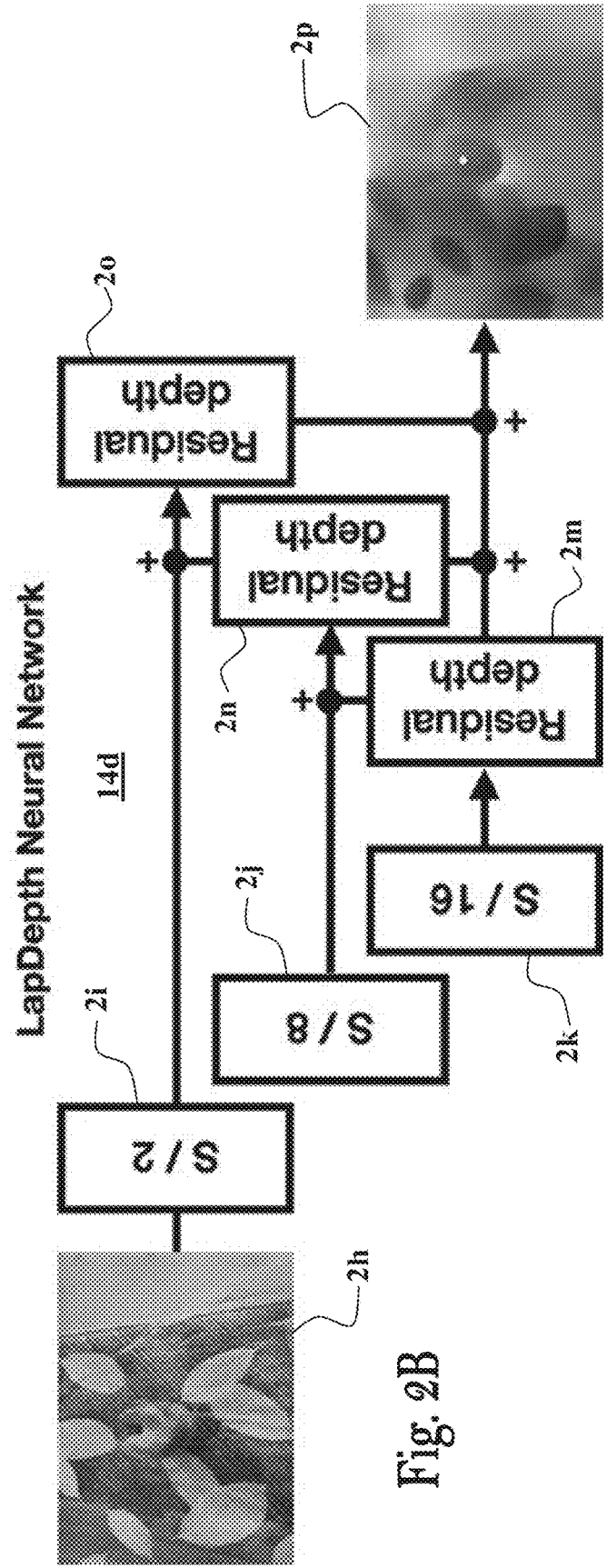

FIG. 2B is a block diagram schematically illustrating a possible embodiment of the depth estimation unit 14d according to possible embodiments. In this specific and non-limiting example the depth estimation unit 14d comprises a LapDepth neural network (see e.g., [3]). This pre-trained deep neural network estimates monocular depth from the reconstructed two-dimensional images 2h by incorporating a Laplacian pyramid into its architecture. The Laplacian pyramid is a multi-scale image representation in which the image is spatially smoothed and subsampled (down sampled). In this specific and non-limiting example the sub-sampling of the processed image data/signals is carried out by the S/2 (i.e., factor 2 image reduction) unit 2i, S/8 (i.e., factor 8 image reduction) unit 2j, and the S/16 (i.e., factor 16 image reduction) unit 2k, where S is the spatial resolution of the reconstructed image 2h.

Within this network, Laplacian residuals of the reconstructed two-dimensional input image 2h guide encoded residual (depth) neural networks that appropriately represent depth properties of different scale-spaces. For example, the subsampled imagery data/signals from the S/16 unit 2k is processed by a residual (depth) neural network 2m, which generates imagery data/signals added to the subsampled image from the S/8 unit 2j for processing by the residual (depth) neural network 2n, which generates imagery data/signals added to the subsampled imagery data/signals from the S/2 unit 2i for processing by the residual neural network 2m. The imagery data/signals generated by the residual neural networks 2m, 2n, and 2o, are summated for generation of the depth imagery data/signals 2p.

In some embodiments the residual neural networks 2m, 2n, and 2o, are implemented utilizing the ResNext101 (see e.g., [21]) network for image encoding (pre-trained for image classification). In such embodiments the residual neural networks 2m, 2n, and 2o, output depth maps, in which the value of each pixel represents its estimated depth in reference to the camera (13). The neural network of the depth estimation unit 14d can be trained on several databases.

In some embodiments the NYU (https://cs.nyu.edu/-silberman/datasets/nyu_depth_v2.html) dataset is used for the training, which addresses indoor depth images.

Optionally, but in some embodiments preferably, the open-sourced CSRT algorithm (see e.g., [2]) is used to implement the spatial tracker unit 14g, which, currently, is one of the most accurate trackers available. The open-sourced CSRT algorithm adapts well to scale deformation and rotation, and considered robust to unpredictable motion and scenarios where no significant motion is apparent. This tracker works by training a correlation filter with compressed features, such as the Histogram of oriented Gradients (HoG). HoG is an image's feature descriptor, distributively characterizing gradient orientations across the image. A correlation filter can be used to search the area around the last known position of the object (11) in successive frames. In possible embodiments the open-sourced CSRT algorithm is implemented in Python e.g., as implemented by the open computer vision (OpenCV) community.

The error correction unit 14e can be configured to produce three-dimensional error signals from the spatial tracking data/signals generated by the spatial tracker unit 14g and the depth data/signals generated by the depth estimator unit 14d, to provide feedback to an adaptive controller (12e) of the robotic arm system 12. The error correction unit 14e can be configured to define spatial error signals ($e_x$, $e_y$) as a normalized $\in[-1,1]$ presentation of the x, and y, coordinates of the center of the tracked object 11 determined from the data/signals generated by the spatial tracker unit 14g, as follows:

$$(e_x, e_y) = (2x_t/W, 2y_t/H).$$

The error correction unit 14e can be configured to determine the depth error data/signal $e_z$ directly from the imagery data/signals generated by the depth estimator unit 14d, at the $x_t$, $y_t$ spatial coordinates of the center of the object 11, as determined by the tracking data/signals generated by the spatial tracker unit 14g.

The error signals ($e_x$, $e_y$, $e_z$) are processed by the encoding unit 14f to produce a neuromorphical representation thereof e.g., complying with the neural engineering framework (NEF) principles. NEF is a theoretical framework for the design of functional spiking neural network (SNN). It can be used to represent and transform mathematical constructs with spiking neurons (see e.g., [5]). A version of NEF was compiled to work on the most prevalent neuromorphic hardware, such as IBM's TrueNorth and Intel's Loihi (see e.g., [6]). With the NEF, mathematical constructs are distributively rate encoded with spikes, generated by a group (or ensemble) of spiking neurons.

In this context, a train of spikes $\delta_i$ generated by the i-th neuron in response to stimulus x is defined by: $\delta_i(x) = G_i [\alpha_i e_i + J_i^b]$, where $G_i$ is a spiking neuron model (i.e., the leaky integrate and fire (LIF) neuron), $\alpha_i$ is a gain term, e, is the neuron's preferred stimulus (encoding vector; the value for which the neuron responds with the highest frequency of spikes), and $J_i^b$ is a fixed background current. The encoded error can be linearly decoded as $\hat{x} = \Sigma_i^N a_i(x) d_i$, where N is the number of spiking neurons (i.e., spiking in the neural network 14h), $a_i(x)$ is the postsynaptic low pass filtered response of the i-th neuron to the stimulus x, and $d_i$ is a linear decoder that was optimized to reconstruct x using least squared optimization. The low-pass filter is an exponential decay filter with a time constant r.

The neuromorphical representation of the error signals ($e_x$, $e_y$, $e_z$) generated by the encoding unit 14f is used as an input to the spiking neural network 14h, configured to generate the neuromorphic control signals data 14s for the adaptive controller (12e) of the robotic arm system 12. The spiking neural network 14h can be implemented by any of the embodiments disclosed and illustrated in U.S. Provisional Patent Application No. 63/183,925 filed on May 4, 2021, and in International Patent Application No. PCT/IL2022/050473, of the same Applicant hereof, and titled "Analog online learning circuit", the disclosure of which is incorporated herein by reference. However, other suitable spiking neural networks can be similarly used instead.

Example

In order to test the three-dimensional tracking techniques disclosed herein, the V2E simulator (see [8]), was used to emulate the event camera 13. The V2E simulator generates synthetic DVS events corresponding realistically to events generated by the DAVIS 346 neuromorphic camera (iniVation, Zurich, Switzerland). Specifically, the V2E simulator generates a text file in which each row corresponds to a specific event comprising a timestamp, a spatial pixel location (x, y), and a polarity (indicating a positive or negative change in luminance).

A testing scenario wherein an event camera (13) moves in three-dimensional space, approaching an apple (the target object 11) disposed on a flat textured surface (a map decorated with texture patterns and leaves), was used to evaluate the three-dimensional object tracking techniques of the present application. It is noted that the movement of the event camera (13) was deliberately shifted from side to side during its travel to the target object (11), as captured in a video stream in order to illustrate the change in the error values generated by the error correction module (unit 14e). The motion was not optimized nor algorithmically guided. The video stream was converted into corresponding luminance-transients spike events (13d) using the V2E simulator, as described hereinabove. The luminance-transients spike events (13d) were introduced into two parallel/simultaneous computing/modules pipelines, corresponding to the embodiments shown in FIGS. 1C and 1D i.e., with and without the two-dimensional image reconstructions 14c.

In both pipelines, the event tensors/summation frames (the tensors and the summation frames Fr, 2a) respectively generated by the events processing module (unit 14a, as shown in FIG. 1C), and by the summation module (unit 14u, as shown in FIG. 1D), were simultaneously introduced into the spatial tracking module (unit 14g) for spatial tracking of the target object (11), and into the depth estimation module (unit 14d) for depth estimation of the target object (11). In possible embodiments, for the purpose of the spatial tracking, the event tensors/summation frames 2a are introduced in two consecutive frames. The resulting error data produced by the error correction module (unit 14e) and neuromorphically represented by the encoding module (unit 14f) was then input into the spiking neural networks (14h) for representation/processing. While in the first pipeline, the event tensors 2a were introduced through a FireNet-based image reconstruction unit 14c, while in the second pipeline, the summation frames Fr of luminance transients events/spikes of each event tensor 2a were used.

Figure 3A:
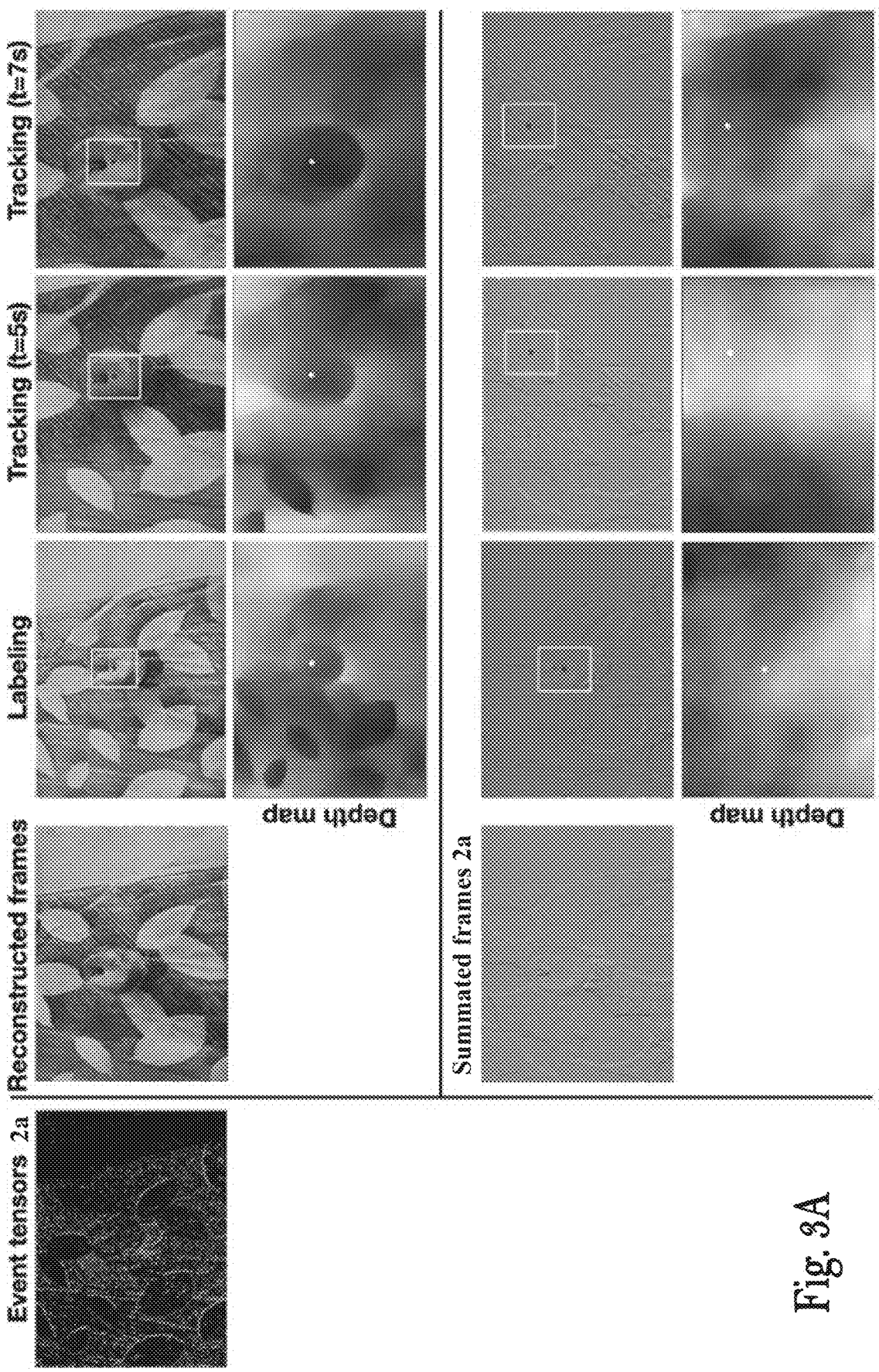

Intel's open-source computer vision annotation tool (CVAT) was used to provide the tracker with its target object using a simple bounding box. The bounding box was defined as the first frame's ground-truth value for the video stream, as shown in FIG. 3A. The depth image data/signals obtained in this test with (upper portion), and without (lower portion), the two-dimensional image reconstruction (14c), are presented in the test results shown in FIG. 3A.

Figure 3B:
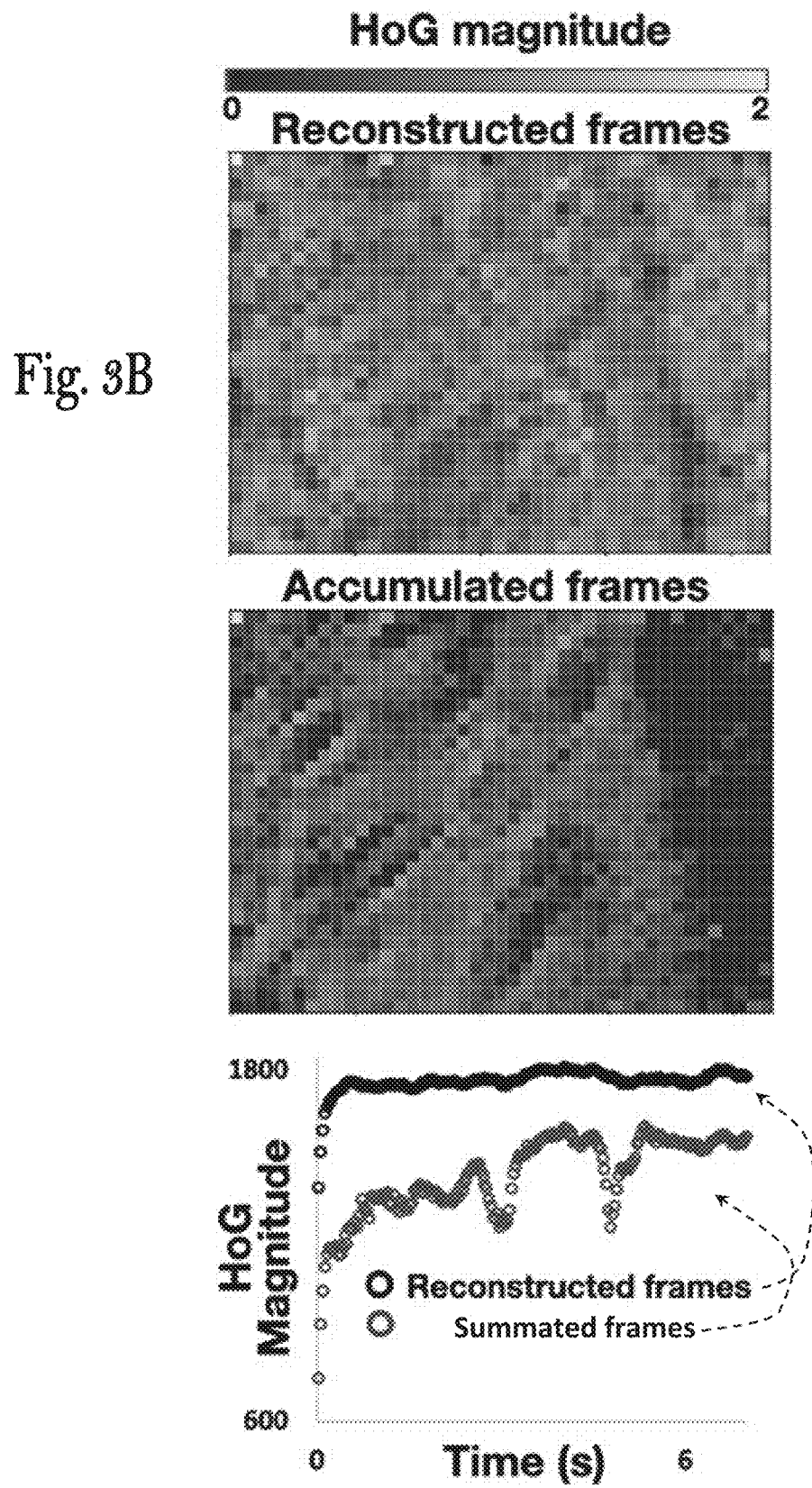

The impact of the image reconstruction path has on the tracker was also tested. By quantifying the magnitude of the HoG, on which the CSRT algorithm is based in this non-limiting example, it was shown that following image reconstruction (13d), the features' magnitude are significantly higher and, notably, stable along with the entire duration of the video, as the test results presented in FIG. 3B show.

Figure 4:
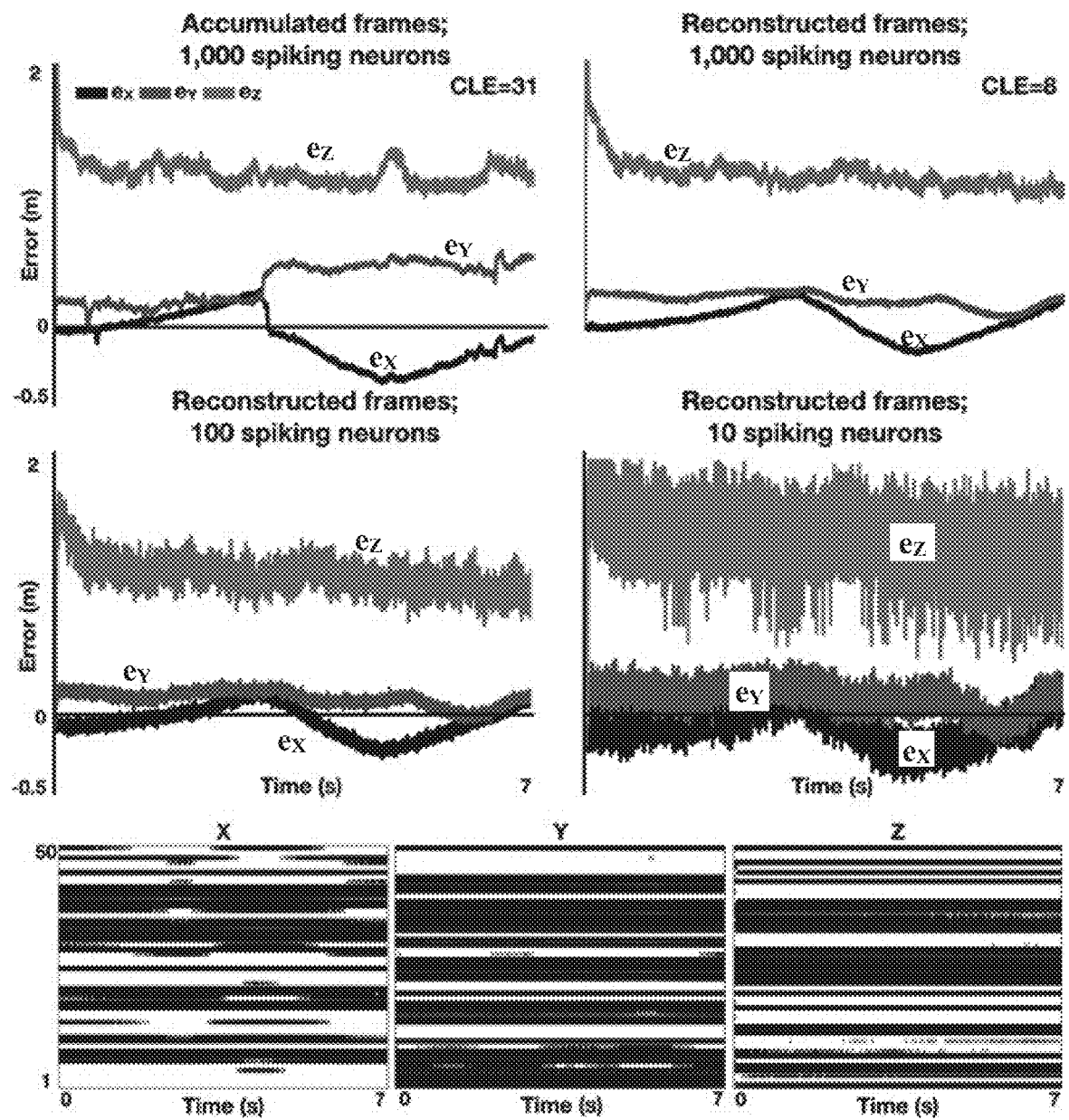
FIG. 4 shows neuromorphic representation with accumulated and reconstructed frames with 10, 100 and 1,000 spiking neurons, and a raster plot showing spiking pattern of the 50 most varied neurons in the 1000 neurons ensemble.

Neuromorphic representation of the error is shown in FIG. 4. The neuromorphic representation comprises the raster plot of spiking neurons and the decoded values of that error. Error signals generated by the reconstruction frames pipeline are smoother and more accurate than those generated by pipeline utilizing the summated frames of luminance-transitions events/spikes. To critically compare the two pipelines, the fact that the CSRT tracker (14g) is responsible for tracking the specified object with a bounding box by specifying the location of its center should be considered. Therefore, the center location error (CLE) metric was used to evaluate the tracker's performance, calculated as the Euclidean distance between the calculated center location derived by the three-dimensional tracker and the ground truth. Ground truth, or the object's location, was specified manually for each consecutive frame using CVAT. The CLE of 8 pixels (<1 cm) was calculated with the first pipeline, in which image reconstruction was utilized, and the CLE of 31 pixels with the second pipeline, in which accumulated luminance transients events were used.

The pipeline utilizing the two-dimensional reconstructed images was further tested with ensembles comprising 10, 100, and 1,000 spiking neurons. A temporal filter T of 10 mSec was used in all cases. Following NEF's error sensitivity analysis (see [7]), it was shown that the more neurons utilized for the representation, the more accurate and stable it is.

The present application demonstrates how recently proposed neural networks for image reconstruction and depth estimation can be used to outperform three-dimensional tracking with bio-inspired event cameras. It was shown that fast image reconstruction can be used with event cameras, such that the number of visual features dramatically increased, providing adequate tracking performance. As most tracking algorithms are, this disclosure is limited to a predefined region of interest. However, for the demonstrated application, wherein a robotic arm system reaches a user-defined object, this limitation is not the primary concern. While the spatial tracking used herein is quite accurate, depth estimation is still preliminary due to the difficulty posed by the scene, where the object was placed on a textured surface. Depth estimation needs to be further calibrated and accelerated to allow its derivation in real-time.

Recent work demonstrated the utilization of SNNs to derive robot's appropriate configuration, given a target position in task space (see [13]). A method been proposed with which NEF-based representation of robot's configuration can be transformed to another configuration using online learning. Given a continuously changing error signal, the system optimizes its configuration such that it would get closer to its target. In possible embodiments the three-dimensional tracker disclosed herein is integrated with the proposed control system [13], for providing vision-based motion guidance. It can be used to drive the transformation between a robot's two representations: current and target joint configurations. By utilizing an event-based three-dimensional tracker to optimize motion planning, high-performing bioinspired closed-loop robotic systems can be designed.

It should also be understood that throughout this disclosure, where a process or method is shown or described, the steps of the method may be performed in any order or simultaneously, unless it is clear from the context that one step depends on another being performed first. It is also noted that terms such as first, second, . . . etc. may be used to refer to specific elements disclosed herein without limiting, but rather to distinguish between the disclosed elements.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Those of skill in the art would appreciate that items such as the various illustrative blocks, modules, elements, components, methods, operations, steps, and algorithms described herein may be implemented as hardware or a combination of hardware and computer software. To illustrate the interchangeability of hardware and software, items such as the various illustrative blocks, modules, elements, components, methods, operations, steps, and algorithms have been described generally in terms of their functionality. Whether such functionality is implemented as hardware or software depends upon the particular application and design constraints imposed on the overall system. Skilled artisans may implement the described functionality in varying ways for each particular application.

In an embodiment where the invention is implemented using software, the software can be stored in a computer program product and loaded into the computer system using the removable storage drive, the memory chips or the communications interface. The software which implements many aspects of the invention can be stored on a media. The media can be magnetic such as diskette, tape or fixed/FLASH disk, or optical such as a CD-ROM. Additionally, the software can be supplied via the Internet or some type of private data network. The control logic (software), when executed by a control processor, causes the control processor to perform certain functions of the invention as described herein.

In possible embodiments, features of the invention are implemented primarily in hardware using, for example, hardware components such as application specific integrated circuits (ASICs) or field-programmable gated arrays (FPGAs). Implementation of the hardware state machine so as to perform the functions described herein will be apparent to persons skilled in the relevant art(s). In yet another embodiment, features of the invention can be implemented using a combination of both hardware and software.

As described hereinabove and shown in the associated figures, the present invention provides three-dimensional tracking techniques and related methods. While particular embodiments of the invention have been described, it will be understood, however, that the invention is not limited thereto, since modifications may be made by those skilled in the art, particularly in light of the foregoing teachings. As will be appreciated by the skilled person, the invention can be carried out in a great variety of ways, employing more than one technique from those described above, all without exceeding the scope of the claims.

REFERENCES

[1] G. Gallego, T. Delbruck, G. M. Orchard, C. Bartolozzi, B. Taba, A. Censi, S. Leutenegger, A. Davison, J. Conradt, K. Daniilidis and D. Scaramuzza, "Event-based Vision: A Survey," IEEE transactions on pattern analysis and machine intelligence, 2020.

[2] A. Lukezic, T. Vojir, L. Cehovin Zajc, J. Matas and M. Kristan, "Discriminative correlation filter with channel and spatial reliability," in Proceedings of the IEEE conference on computer vision and pattern recognition, 2017.

[3] M. Song, S. Lim and W. Kim, "Monocular Depth Estimation Using Laplacian Pyramid-Based Depth Residuals," IEEE Transactions on Circuits and Systems for Video Technology, 2021.

[4] C. Scheerlinck, H. Rebecq, D. Gehrig, N. Barnes, R. Mahony and D. Scaramuzza, "Fast image reconstruction

[5] C. Eliasmith and C. H. Anderson, Neural engineering: Computation, representation, and dynamics in neurobiological systems, MIT press, 2003.

[6] A. Hazan and E. Ezra Tsur, "Neuromorphic Analog Implementation of Neural Engineering Framework-Inspired Spiking Neuron for High-Dimensional Representation," Frontiers in Neuroscience, vol. 15, p. 109, 2021.

[7] T. DeWolf, P. Jaworski and C. Eliasmith, "Nengo and low-power AI hardware for robust, embedded neurorobotics," Frontiers in Neurorobotics, vol. 14, 2020.

[8] Y. Hu, S.-C. Liu and T. Delbruck, "v2e: From Video Frames to Realistic DVS Events," in IEEE/CVF Conference on Computer Vision and Pattern Recognition Workshops (CVPRW), 2021.

[9] F. Barranco, C. Fermuller and E. Ros, "Real-time clustering and multi-target tracking using event-based sensors," in IEEE/RSJ International Conference on Intelligent Robots and Systems (IROS), 2018.

[10] R. Jiang, X. Mou, S. Shi, Y. Zhou, Q. Wang, M. Dong and S. Chen, "Object tracking on event cameras with offline-online learning," CAAI Transactions on Intelligence Technology, vol. 5, no. 3, pp. 165-171, 2020.

[11] B. Ramesh, S. Zhang, H. Yang, A. Ussa, M. Ong, G. Orchard and C. Xiang, "e-TLD: Event-based Framework for Dynamic Object Tracking," IEEE Transactions on Circuits and Systems for Video Technology, 2020.

[12] A. Ussa, C. S. Rajen, D. Singla, J. Acharya, G. F. Chuanrong, A. Basu and B. Ramesh, "A Hybrid Neuromorphic Object Tracking and Classification Framework for Real-time Systems," arXiv preprint, p. 2007.11404, 2020.

[13] Y. Zaidel, A. Shalumov, A. Volinski, L. Supic and E. E. Tsur, "Neuromorphic NEF-based inverse kinematics and PID control," Frontiers in Neurorobotics, vol. 15, 2021.

[14] C. Godard, O. Mac Aodha, M. Firman, G. Brostow, "Digging Into Self-Supervised Monocular Depth Estimation", Proc. IEEE Int. Conf. Comput. Vis. 2019.

[15] X. LUO, JB. HUANG, R. SZELISKI, K. MATZEN, J. KOPF, "Consistent Video Depth Estimation", ACM Transactions on GraphicsVolume 39, Issue 4, July 2020.

[16] L. Wang, T K. Kim, K J. Yoon, "EventSR: From Asynchronous Events to Image Reconstruction, Restoration, and Super-Resolution via End-to-End Adversarial Learning", Proceedings of the IEEE/CVF Conference on Computer Vision and Pattern Recognition, Seattle, WA, USA, 14-19 Jun. 2020; pp. 8315-8325.

[17] B. Su, L. Yu, W. Yang, "Event-Based High Frame-Rate Video Reconstruction With A Novel Cycle-Event Network", IEEE Int. Conf. Image Processing (ICIP), 2020.

[18] M. Mostafavi, L. Wang, KJ. Yoon, "Learning to Reconstruct HDR Images from Events, with Applications to Depth and Flow Prediction", International Journal of Computer Vision (2021) 129:900-920.

[19] H. Rebecq, R. Ranftl, V. Koltun, D. Scaramuzza, "Events-to-Video: Bringing Modern Computer Vision to Event Cameras", Proceedings of the IEEE Conference on Computer Vision and Pattern Recognition, CVPR 2019, pp. 3857-3866, Computer Vision Foundation/IEEE, Long Beach, CA, USA, June 2019.

[20] H. Cohen Duwek, A. Shalumov, E. Ezra Tsur, "Image Reconstruction from Neuromorphic Event Cameras using Laplacian-Prediction and Poisson Integration with Spiking and Artificial Neural Networks", IEEE Conf. Computer Vision and Pattern Recognition Workshops (CVPRW), 2021.

[21] S. Xie, R. Girshick, P. Dollar, Z. Tu, and K. He., "Aggregated residual transformations for deep neural networks," in Proc. IEEE Int. Conf. Comput. Vis. Pattern Recognit., July 2017, pp. 5987-5995.

[22] Tsur, Elishai Ezra. Neuromorphic Engineering: The Scientist's, Algorithm Designer's, and Computer Architect's Perspectives on Brain-Inspired Computing. CRC Press, 2021.

The invention claimed is:

1. A tracking system comprising:
one or more dynamic vision sensors configured to generate luminance-transition events associated with a target object;
a depth estimation unit configured to employ a Laplacian pyramid-based monocular depth estimation neural network to generate based on the luminance-transition events generated by said one or more dynamic vision sensors, depth data/signals indicative of a distance of said target object from said one or more dynamic vision sensors;
a spatial tracking unit configured to employ channel and spatial reliability tracking techniques to generate based on the luminance-transition events generated by said one or more dynamic vision sensors, spatial tracking signals/data indicative of transitions of said target object in a scene of said target object; and
an error correction unit configured to process the depth and spatial tracking data/signals and generate based thereon error correcting data/signals for the tracking of said target object by said one or more dynamic vision sensors.

2. The system of claim 1 comprising an image reconstruction unit configured to generate image reconstruction data based on the luminance-transitions events generated by the one or more dynamic vision sensors, and input the same to the depth estimation and spatial tracking units.

3. The system of claim 1 comprising an events processing unit configured to arrange the luminance-transition events generated by the one or more dynamic vision sensors in one or more luminance-transient event frames for the generation of the depth data/signals by the depth estimation unit, and for the generation of the spatial tracking signals/data by the spatial tracking unit, therefrom.

4. The system of claim 3 comprising a summation unit configured to summate the one or more luminance-transition events frames generated by the events processing unit for the generation of the depth data/signals by the depth estimation unit, and for the generation of the spatial tracking signals/data by the spatial tracking unit, therefrom.

5. The system of claim 4 comprising one or more neural networks configured and/or operable to generate based on the error correcting data/signals, control data/signals for adjusting the location of the one or more dynamic vision sensors with respect to the target object.

6. The system of claim 5 comprising an encoding unit configured to encode the error correction-data/signals generated by the error correction unit for generation of the control data/signals by the one or more neural networks.

7. The system of claim 6 wherein the one or more neural networks comprise a spiking neural network.

8. The system of claim 6 comprising one or more actuators configured to move the one or more dynamic vision sensors with respect to the target object in accordance with the control data/signals.

9. The system of claim 1 wherein the one or more dynamic vision sensors are mounted on a robotic arm system configured to move said one or more dynamic vision sensors with respect to the target object in correspondence with the error correcting data/signals.

10. The system of claim 2 comprising an events processing unit configured to arrange the luminance-transition events generated by the one or more dynamic vision sensors in one or more luminance-transient event frames for the generation of the image reconstruction data by the image reconstruction unit, therefrom.

11. The system of claim 10 comprising one or more neural networks configured and/or operable to generate based on the error correcting data/signals, control data/signals for adjusting the location of the one or more dynamic vision sensors with respect to the target object.

12. The system of claim 11 comprising an encoding unit configured to encode the error correction-data/signals generated by the error correction unit for generation of the control data/signals by the one or more neural networks.

13. The system of claim 12 wherein the one or more neural networks comprise a spiking neural network.

14. The system of claim 12 comprising one or more actuators configured to move the one or more dynamic vision sensors with respect to the target object in accordance with the control data/signals.

15. The system of claim 1 wherein the one or more dynamic vision sensors are part of an event camera.

16. A method of tracking a target object based on luminance-transitions events acquired by one or more dynamic vision sensors from a scene comprising said target object, the method comprising: estimating, by a Laplacian pyramid-based monocular depth estimation neural network, depth data/signals associated with said target object based on the luminance-transitions events, generating, by channel and spatial reliability tracking techniques, spatial tracking signals/data indicative of transitions of said target object in the scene based on the luminance-transitions events, and processing the depth and spatial tracking data/signals and generating error correcting data/signals for the tracking of said target object by said one or more dynamic vision sensors.

17. The method of claim 16 comprising arranging the luminance-transitions events in one or more luminance-transients event frames and summating said one or more luminance-transients event frames for the estimation of the depth data/signals and for the generation of said spatial tracking data/signals.

18. The method of claim 16 comprising reconstructing a two-dimensional image based on the luminance-transitions events for the estimation of said depth data/signals and for the generation of said spatial tracking data/signals.

19. The method of claim 17 comprising processing the error correcting data/signals by one or more neural networks and generating control data/signal for the tracking of the target object.

20. The method of claim 19 comprising processing the error correcting data/signals and generating therefrom corresponding spike data/signal for generation of the control data/signal by the one or more neural networks.

21. The method of claim 17 comprising processing the error correcting data/signals by one or more neural networks and generating control data/signal for the tracking of the target object.

22. The method of claim 21 comprising processing the error correcting data/signals and generating therefrom corresponding spike data/signal for generation of the control data/signal by the one or more neural networks.

* * * * *